Patented Dec. 30, 1930

1,786,563

UNITED STATES PATENT OFFICE

HARRY L. FISHER, OF LEONIA, NEW JERSEY, ASSIGNOR TO THE B. F. GOODRICH COMPANY, OF NEW YORK, N. Y., A CORPORATION OF NEW YORK

CELLULAR COMPOSITION AND METHOD OF MAKING SAME

No Drawing.  Application filed December 28, 1926. Serial No. 157,617.

This invention relates to cellular material and has for an object to produce a cellular material which shall be strong yet light in weight and comparatively inexpensive to manufacture. A further general object is to provide a method for producing such cellular material.

It has heretofore been proposed to produce cellular material by incorporating a blowing agent in a vulcanizable rubber compound and subjecting the admixture to vulcanizing temperatures which cause the blowing agent to form gases or vapors within the body of the rubber producing a multipilicity of cells and thus forming upon vulcanization a construction commonly known as sponge rubber.

I have observed that where thermoplastic materials are made from rubber by treatment at elevated temperatures with isomerizing agents for rubber, such as organic sulfonyl chlorides, organic sulfonic acids, or sulfuric acid, amphoteric halides, etc., there is always a large quantity of gases formed in the reaction which, due to the thermoplastic character of the mass, are largely expelled. I have now found that if, in the preparation of these thermoplastic products, sulfur is added to the initial admixture of rubber and isomerizing reagent, the multiplicity of cells formed by the liberated gases become practically permanent in the mass since the vulcanizing action of the sulfur causes the cell walls to become more or less rigid and the escape of the generated gases is therefore inhibited. In this latter reaction, the isomerizing reagent acts in a dual capacity, as a blowing agent as in the prior methods of making cellular material and in addition it reacts upon the rubber to produce an isomeric form thereof having distinctly different characteristics than vulcanized cellular or sponge rubber made with the ordinary blowing agents. Blowing agents may, however, be additionally employed in the process of the present invention, if it is desired to produce a resulting cellular structure of a very low apparent specific gravity.

What takes place in the reaction above described is not at present definitely known. It is known, however, that where an isomerizing agent for rubber is dispersed through a mass of rubber and the batch heated to relatively high temperatures, a conversion product differing widely in its chemical and physical properties from rubber but having the same empirical formula as rubber and a less chemical unsaturation is produced. Experimentation has shown that this conversion product of rubber vulcanizes with sulfur much in the same manner as does the original rubber from which it was produced. The cellular material obtained by the process of this application has been found to be a vulcanized rubber isomer, and this changed chemical compostion of the rubber undoubtedly accounts for its superior strength to, and its more uniform cellular structure than, the so-called sponge rubbers.

*Example 1.*—By way of an example of the preparation of a hard cellular composition, I masticate upon a rubber mill 100 parts by weight of rubber and add thereto during mastication 7.5 parts of phenol sulfonic acid and 30 parts of sulfur. The order of mixing is immaterial, and the sulfur if desired, may be added prior to the sulfonic acid, or they may be added simultaneously. When these ingredients have been thoroughly dispersed through the rubber the mass is heated, as in a hot air oven for about five hours at a temperature of about 300° F, and the mixture, either unconfined or disposed within a mold during the heating, is allowed to spread out and expand. There results a strong, hard, cellular material light in weight and having an apparent gravity of approximately 0.35.

*Example 2.*—As an example of the preparation of a hard, cellular composition in which an added blowing agent is employed, I add to the ingredients specified in the foregoing Example 1, ten parts by weight of nitrated rubber and subject the admixed mass to heat under the same conditions. A much lighter product of finely porous or cellular construction is produced, its apparent gravity being approximately 0.20.

The recipes given in the above Examples 1 and 2 do not, however, find any large use in actual practice since it is desirable in commercial products to add to the composition certain well known rubber compounding ingredients. The following example illustrates a commercial recipe employing the principles of the above examples.

*Example 3.*—A relatively inexpensive hard cellular composition may be produced in the following manner: Mix into 35 parts by weight of rubber, upon a rubber mill or otherwise, 20 parts of a high grade of reclaimed rubber, 25 parts of sulfur, 5 parts of hard rubber dust, 3 parts of cottonseed oil, 6 parts of pine tar, and 6 parts of concentrated sulfuric acid (specific gravity 1.82). When these ingredients have been thoroughly and intimately admixed, heat the mass under such conditions as to permit a substantial volumetric expansion thereof. Where the above mix is placed in a mold or between spaced plates which permit a 200% volumetric expansion, and is heated for 90 minutes at an oven temperature of 324° F., there results a cellular product having an apparent gravity of about 0.35.

*Example 4.*—It has been found that mixtures of the above-mentioned isomerizing agents may be employed with advantage in producing the hard cellular compositions of this application. Thus, I prepare an admixture of 8 parts of p-toluene sulfonic acid and 2 parts of common sulfuric acid (specific gravity 1.82), preferably although not necessarily adding 2 parts of water, and disperse the admixed acids into 100 parts by weight of rubber, as on a rubber mill. To this batch 34 parts by weight of sulfur and 5 parts of nitrated rubber are added. It is to be understood that either or both the sulfur or nitrated rubber may be added to the rubber prior to the addition of the acid mixture. The batch, when placed in a chamber permitting a volumetric expansion of about 400% and heated in the manner above described for five hours at a temperature of 300° F., results in an extremely light, hard, strong cellular product which has a thin dense skin and a cellular interior portion having an apparent specific gravity of approximately 0.10.

Variations in the degree of hardness of the products described hereinabove may be obtained by varying the amount of sulfur or of isomerizing agent, or the time or temperature of heating, or any two or more of these factors, as is well understood by those skilled in the art of vulcanization of rubber. Thus, a soft spongy cellular material may be formed by decreasing the amounts of the sulfur and isomerizing agent and the time of cure specified in Example 2 above.

*Example 5.*—The following procedure has been found to give very satisfactory soft cellular products: Into 70 parts by weight of rubber, add 6 parts of phenol sulfonic acid, 10 parts of sulfur, 5 parts of nitrated rubber, and 9 parts of hard rubber dust, a thorough admixture of the ingredients being obtained by any suitable mixing operation; then place the batch in a mold of a size to permit a volumetric expansion of the mass of approximately 200 percent and heat for 60 minutes at 324° F. The resulting product is a soft, flexible sponge or cellular material.

*Example 6.*—Similar cellular products may also be obtained by milling sulfur and a blowing agent into a rubber isomer and subjecting the mass to heat. Thus, I take 100 parts by weight of a rubber isomer (previously prepared by reacting 7.5 parts by weight of phenol sulfonic acid and 100 parts of rubber) and mill thereinto 25 parts of sulfur and 20 parts of sodium bicarbonate. The batch is heated in a container permitting a 100 percent expansion for 90 minutes at 324° F. A hard strong cellular material resembling the material of Example 1 results.

It is to be understood that other isomerizing reagents than those specified in the above examples may be employed. The following reagents embraced within the general formula $R—SO_2—X$, in which R represents an organic radical or a hydroxy group and X represents a hydroxy group or chlorine, are capable of employment in the above described procedure, and include the organic sulfonyl chlorides, such as benzene, naphthalene, p-toluene, nitro-benzene and o-dichloro-benzene sulfonyl chlordies; the organic sulfonic acids, such as ethyl sulfonic acid, beta naphthalene sulfonic acid, cymene-sulfo-stearic acid, sulfo-salicylic acid, and other derivatives containing an available sulfonic group, and the amphoteric metallic salts of sulfonic acids. The halides of amphoteric metals, the dialkyl sulfates, and other isomerizing agents of rubber may also be employed. These substances, which possess the common property of converting rubber at elevated temperatures into an isomeric product containing carbon and hydrogen in the same ratio as rubber but having a less degree of chemical unsaturation than rubber, will generically be termed "isomerizing agents for rubber" in the appended claims.

Tests have demonstrated that the common blowing agents may be used, but where any blowing agent reacts with the isomerizing agent employed, allowance for this reactivity must be made in determining the amounts of these reagents to be used in any such batch. Sodium bicarbonate, calcium carbonate, starch, palm oil and water have been employed with satisfactory results.

Wide variations may also be employed in the times and temperatures to which the mixtures of the foregoing recipes are subjected as will be readily understood by those skilled in the art of vulcanization of rubber. Further, the pigments and softeners listed in the above example are merely illustrative and other similar ingredients well known in the rubber compounding art may be substituted therefor.

It is obvious that various modifications may be made in the above described processes without departing from the principles of the invention herein set forth and it is my intention not to limit the appended claims except as may be necessitated by the prior art.

I claim:

1. The herein described method of preparing a cellular composition which comprises treating at an elevated temperature a vulcanizable rubber composition with an isomerizing agent for rubber.

2. The hereindescribed method of preparing a cellular composition which comprises treating at elevated temperatures a vulcanizable rubber composition containing sulfur and pigments with an isomerizing agent for rubber.

3. The herein described method of preparing a cellular composition which comprises treating at elevated temperatures a vulcanizable rubber composition containing a blowing agent with an isomerizing agent for rubber.

4. The herein described method of preparing a cellular composition by treating at elevated temperatures rubber containing sulfur with a substance of the generic formula $R-SO_2-X$.

5. The herein described method of preparing a cellular composition by treating at elevated temperatures rubber containing sulfur with an acid reagent composed at least in part of sulfuric acid.

6. The herein described method of preparing a cellular composition by treating at elevated temperatures rubber with sulfur and with an acid reagent composed at least in part of an organic sulfonic acid.

7. The herein described method of preparing a cellular composition by treating at elevated temperatures rubber with sulfur and with a mixture of an organic sulfonic acid and sulfuric acid.

8. The herein described method of preparing a hard cellular composition by treating a vulcanizable rubber compound at elevated temperatures with an acid reagent composed of a mixture of p-toluene sulfonic acid and sulfuric acid.

9. The herein described cellular composition composed of rubber treated at elevated temperatures with a vulcanizing agent and an isomerizing agent for rubber.

10. The herein described cellular composition composed of a rubber compound treated at elevated temperatures with sulfur and a substance of the generic formula $R-SO_2-X$.

11. The herein described cellular material comprising a blown vulcanized rubber isomer having a less degree of chemical unsaturation than rubber.

12. The herein described composition of matter comprising a vulcanized rubber isomer having a less degree of chemical unsaturation than rubber.

In witness whereof I have hereunto set my hand this 20th day of November, 1926.

HARRY L. FISHER.